United States Patent [19]

Domres

[11] 4,389,039

[45] Jun. 21, 1983

[54] CUTTING TORCH GUIDE AND ACCESSORIES THEREFOR

[76] Inventor: Franklin W. Domres, 4117 Crescent Beach Rd., Manistee, Mich. 49660

[21] Appl. No.: 299,879

[22] Filed: Sep. 8, 1981

Related U.S. Application Data

[63] Continuation-in-part of Ser. No. 235,524, Feb. 18, 1981, abandoned.

[51] Int. Cl.³ .............................................. B23K 7/10
[52] U.S. Cl. ................................................... 266/77
[58] Field of Search ............................. 266/72, 77, 48

[56] References Cited

U.S. PATENT DOCUMENTS

| | | | |
|---|---|---|---|
| 1,289,219 | 12/1918 | Marsh | 266/72 |
| 1,370,882 | 3/1921 | Crandall | 266/48 |
| 2,413,117 | 12/1946 | Smith | 266/48 |
| 2,580,398 | 1/1952 | Braswell | 266/48 |
| 2,582,011 | 1/1952 | Cunningham | 266/48 |
| 3,357,690 | 12/1967 | Firestone | 266/48 |

*Primary Examiner*—W. Stallard
*Attorney, Agent, or Firm*—Price, Heneveld, Huizenga & Cooper

[57] ABSTRACT

A cutting torch guide comprises a torch mounting carriage advanceable along a track by a threaded member on the carriage in releasable engagement with a feed screw. Release of the bearing from the feed screw allows rapid return of the carriage. Accessories for the guide include a vertically adjustable bench on which the guide may be attachably mounted in a cantilever fashion, a pipe cutter attachment, an arc cutter attachment, and two disc cutter attachments which are adapted for cutting large and small circles, and the like.

46 Claims, 34 Drawing Figures

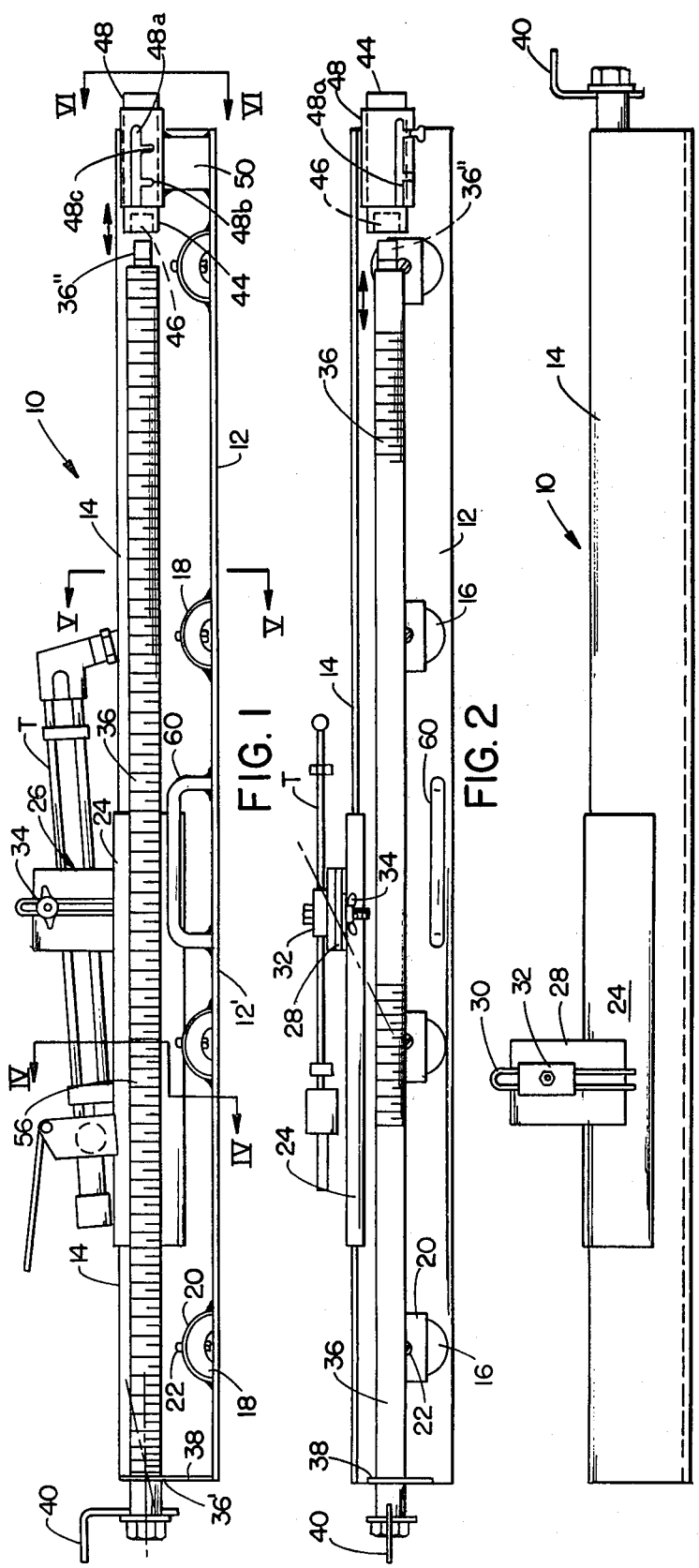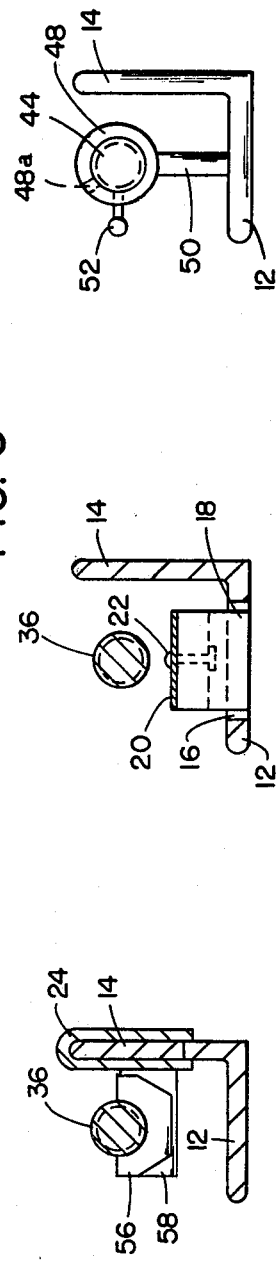

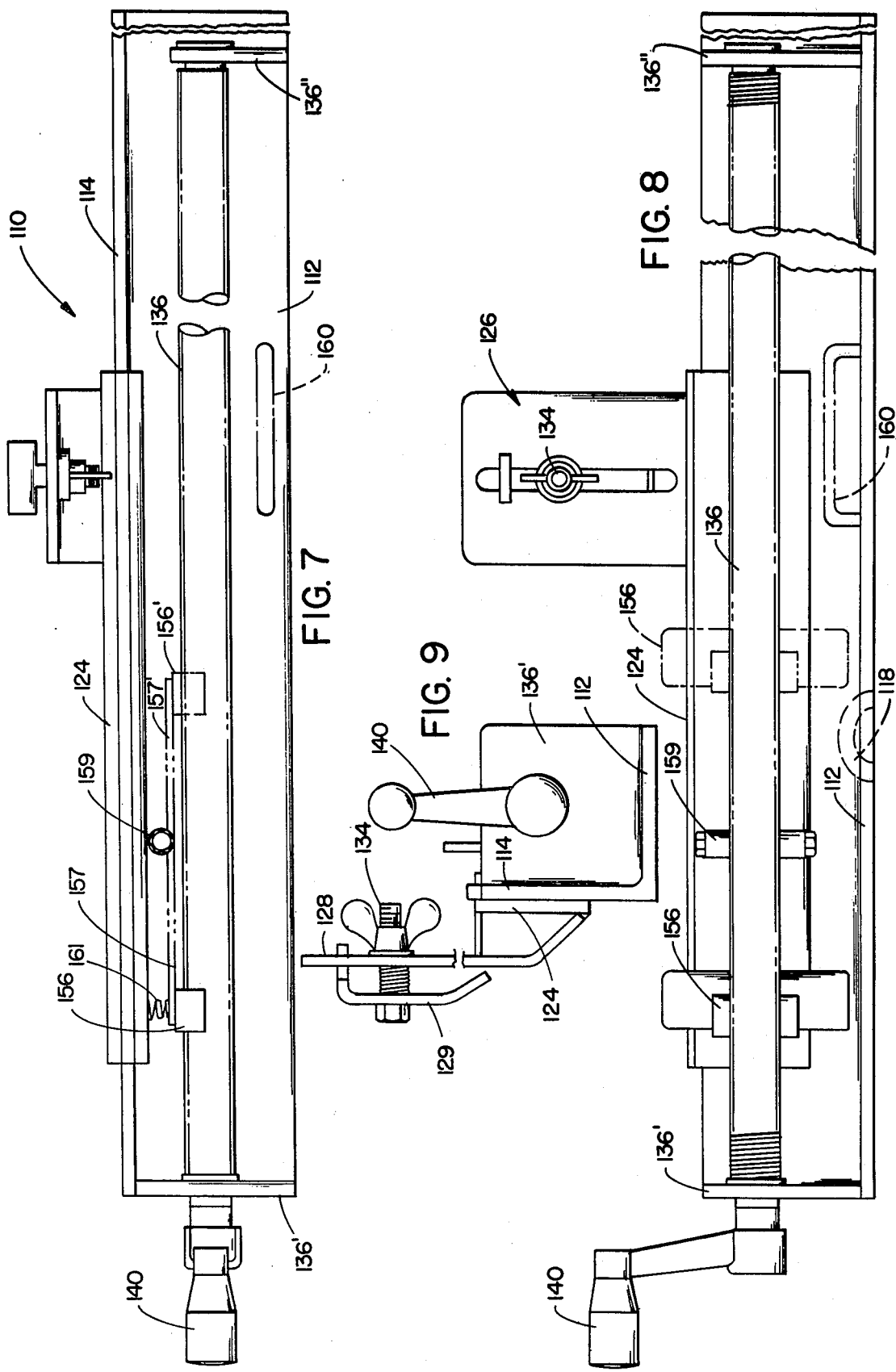

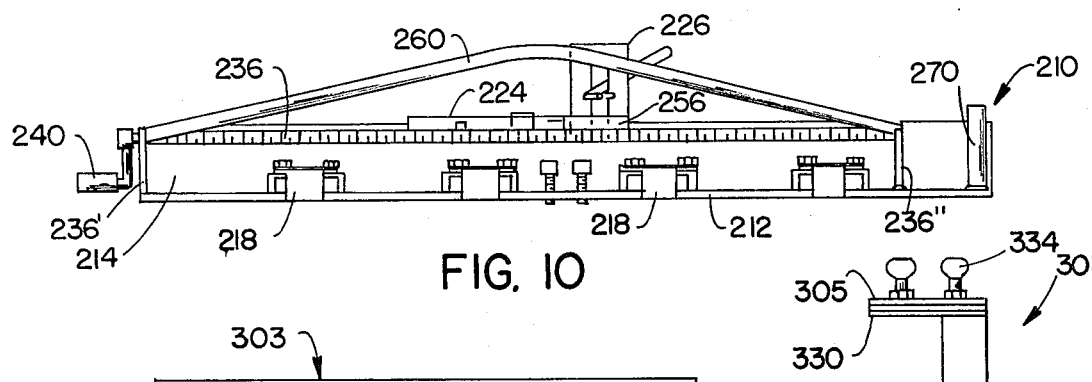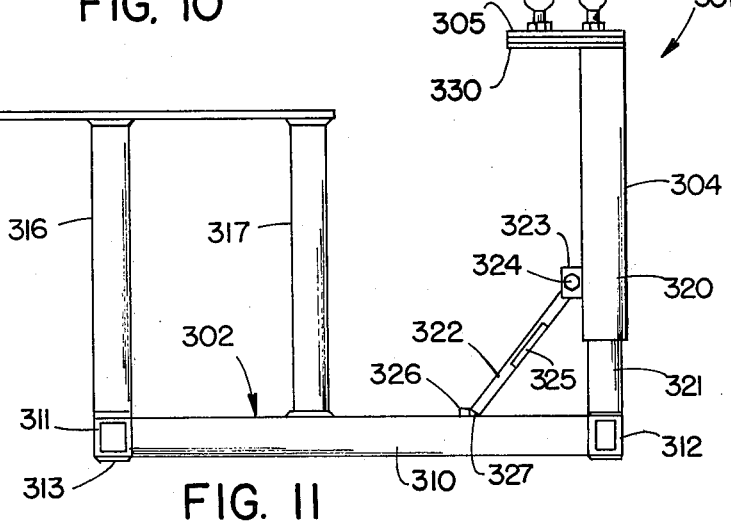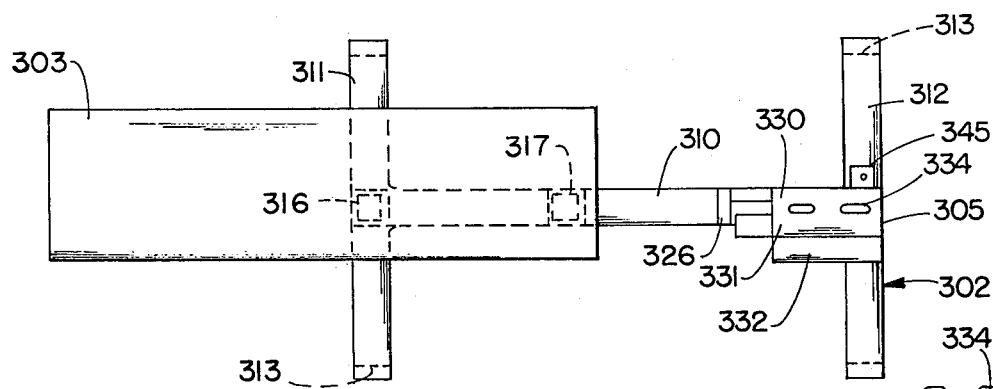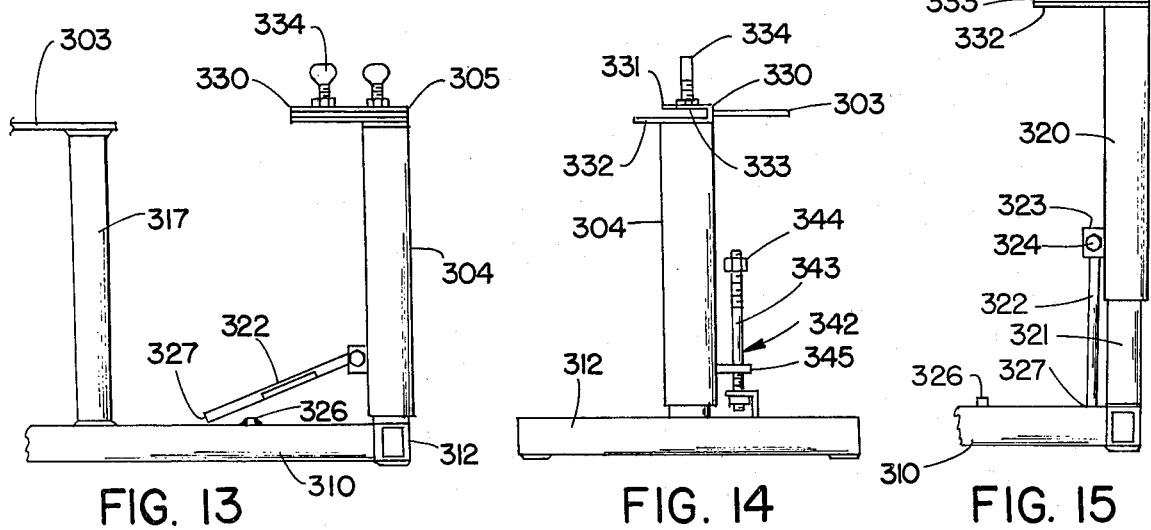

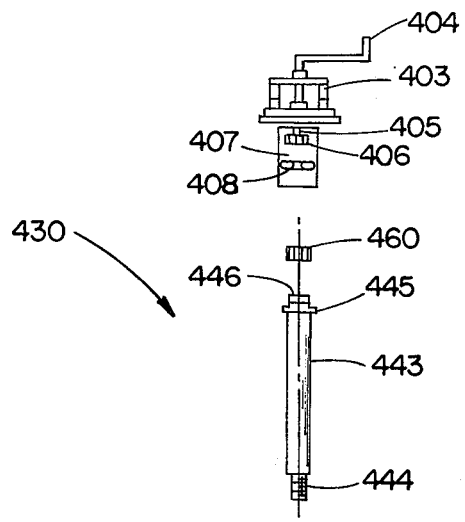
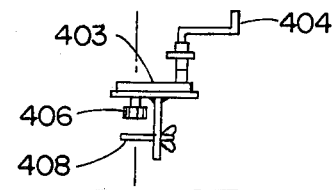
FIG. 27
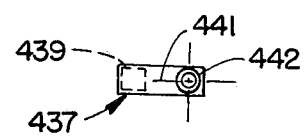
FIG. 28
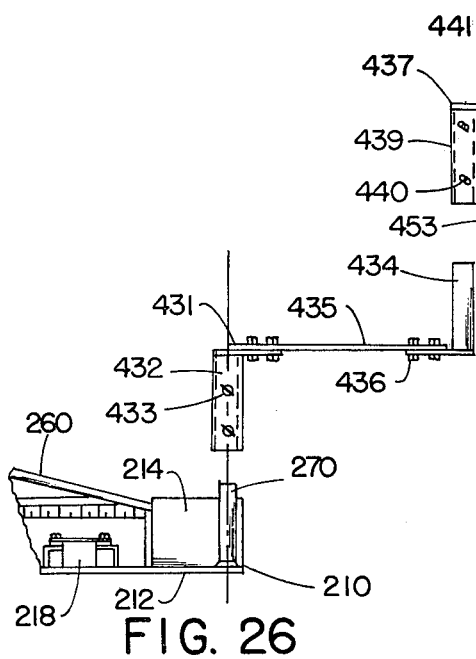
FIG. 26
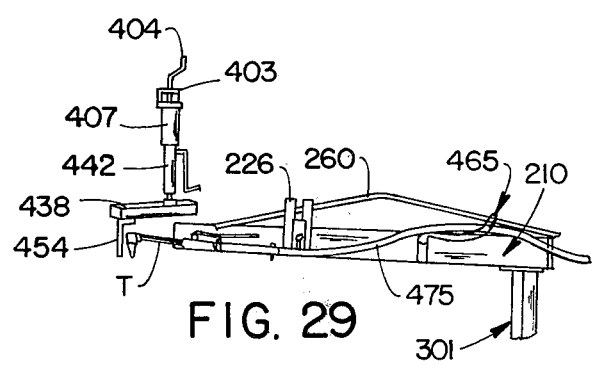
FIG. 29
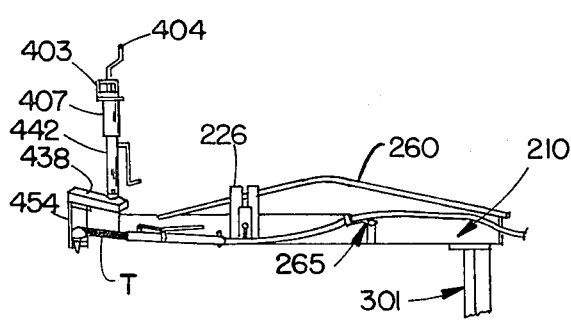
FIG. 30
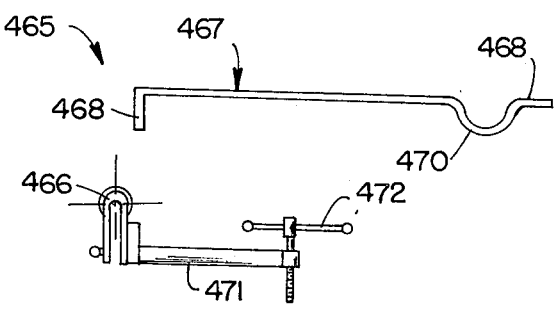
FIG. 31

CUTTING TORCH GUIDE AND ACCESSORIES THEREFOR

CROSS-REFERENCE TO RELATED APPLICATION

The present application is a continuation-in-part of my copending U.S. patent application Ser. No. 235,524, filed Feb. 18, 1981, now abandoned entitled LEAD SCREW PORTABLE TORCH DRIVE, which is hereby incorporated by reference.

BACKGROUND OF THE INVENTION

The present invention relates to torch cutters, and in particular to a guide and accessories therefor.

Mechanized advancement of a cut-off torch along a workpiece is generally known, there having been a variety of machines devised for this general purpose. Some of these employ a lead screw for torch advancement, see e.g., U.S. Pat. Nos. 3,908,973; 3,713,635; 3,485,306; 2,496,110; 2,448,089; 2,283,347; 2,107,396; 1,696,916; 1,674,843; 1,358,637; British Pat. No. 546,009 and German Pat. No. 339,438. Typically, such machines are permanent type units, although some special purpose units such as the H-beam upper end cutter in U.S. Pat. No. 3,908,973 can be clamped to the workpiece, or as in U.S. Pat. No. 3,485,306 and British Pat. No. 546,009 can be magnetically secured to the workpiece. U.S. Pat. 3,908,973 also sets forth one type of screw drive release mechanism.

SUMMARY OF THE INVENTION

One aspect of this invention is a portable cut-off torch support and guide capable of quick and easy attachment to a workpiece in any desired location, e.g., even in a storage yard so that there is no necessity of transporting large heavy stock to a special processing area, and no requirement for electrical power. The unit is particularly advantageous for small welding shops and farm usage. With the novel unit, straight and accurate cuts can be achieved, and the carriage which advances the torch, after advancement, can be quickly manually returned to its starting position.

The torch mount is on a carriage advanceable along a feed screw having a releasable threaded connection to a threaded follower on the carriage. In one embodiment, the lead screw is supported on one end thereof by a stationary bearing, and at the other end thereof by a shiftable second bearing releasable from the fed screw to allow the lead screw to disengage the threaded follower. In another embodiment, the second bearing is fixed, and the threaded follower is shiftable to disengage the lead screw.

Another aspect of the present invention is a bench to which the torch guide is detachably connected for support in a cantilevered fashion over a work platform. The height of the bench is adjustable, so that in a lowered position large articles to be cut can be clamped between the guide and the platform. In the raised condition, smaller articles can be attached to retention magnets along the base of the guide. The bench holds the torch guide in a stable, stationary condition to facilitate accurate cutting.

Another aspect of the present invention is a pipe cutter attachment, comprising first and second stands which securely support an elongate section of pipe, with means to rotate the pipe directly beneath the torch to cut off a selected length. The torch holder is adjustable so that the line of cutting is substantially perpendicular to the axis of rotation of the pipe to achieve a clean, even, flat cut. Each of the stands includes a pair of discs rotatably mounted on a frame in a side-by-side fashion to support the pipe section on the peripheral edges of the discs. One of the stands includes a central drive wheel which rotates both discs in the same direction and at the same speed, thereby rotating the pipe section abuttingly supported thereon.

Yet another object of the present invention is a disc cutter attachment for large circles and the like, comprising a magnetic base adapted for anchoring the guide to a ferro-magnetic article to be cut, with an upstanding spindle which is rotatably received in a mating sleeve bearing. A manually driven speed reducer rotates the torch guide in a circle about the vertical axis of the bearing, so that the torch cuts along an arcuate line. The torch holder can be translated longitudinally along the guide to vary the diameter of the arc being cut.

Yet another aspect of the present invention is an arc cutting attachment which is connected to the end of the guide to cut curvilinear portions. The arc cutter attachment comprises a bracket on which a torch support arm is rotatably mounted and driven by a manual speed reducer. Preferably, the torch holder is rotatably attached to the end of the support arm, so that the torch can be rotated freely at the end of the torch guide.

Yet another aspect of the present invention is a disc cutter attachment for small circles, and comprises a bracket which is connected with the free end of the torch guide, and includes a vertically oriented bearing with a drive shaft rotatably mounted therein. A magnetic retainer is connected with the lower end of the drive shaft, and is adapted to attach ferro-magnetic articles thereto. The longitudinal position of the torch carriage is positioned along the length of the guide so as to cut off the article attached to the magnetic retainer along a selected radius.

The principal objects of the present invention are to provide a torch cutting arrangement or kit which is both portable for use in storage yard environments, and can also be used in conjunction with a bench for in-shop uses. The various parts of the torch cutter kit can be easily assembled and disassembled to achieve great flexibility. The torch cutter is designed to achieve safe cutting action, that is also quite accurate and efficient.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a front elevational view of a cutting torch guide, embodying the present invention;

FIG. 2 is a plan view of the apparatus in FIG. 1;

FIG. 3 is an elevational view from the opposite side of that in FIG. 1;

FIG. 4 is a sectional view taken on section IV—IV of FIG. 1;

FIG. 5 is a sectional view taken on section V—V of FIG. 1;

FIG. 6 is an end elevational view taken in the direction VI—VI of FIG. 1;

FIG. 7 is a plan view of a second embodiment of the torch guide apparatus;

FIG. 8 is a front elevational view of the apparatus in FIG. 7;

FIG. 9 is an end elevational view of the second embodiment, viewed from the left end of FIG. 8;

FIG. 10 is a side elevational view of a third embodiment of the torch guide apparatus;

FIG. 11 is a side elevational view of a bench, adapted for mounting the torch guide thereon, and being shown in a partially raised position;

FIG. 12 is a top plan view of the bench shown in FIG. 11;

FIG. 13 is fragmentary, side elevational view of the bench shown in a lowered position;

FIG. 14 is an end elevational view of the bench shown in the lowered position;

FIG. 15 is a fragmentary, side elevational view of the bench shown in a fully raised position;

FIG. 26 is an exploded, elevational view of an arc cutter attachment for the present invention;

FIG. 27 is a side elevational view of a manual speed reducer drive;

FIG. 28 is a top plan view of a bracket member portion of the arc cutter shown in FIG. 26;

FIG. 29 is a fragmentary, perspective view of the arc cutter attachment of FIG. 26, shown assembled on the torch guide;

FIG. 30 is a perspective view of the arc cutter attachment illustrated in FIG. 29, shown in an alternate position;

FIG. 31 is an elevational view of a hose holder mechanism for the arc cutter illustrated in FIGS. 26–30;

DETAILED DESCRIPTION OF THE PREFERRED EMBODIMENTS

Figure 16:
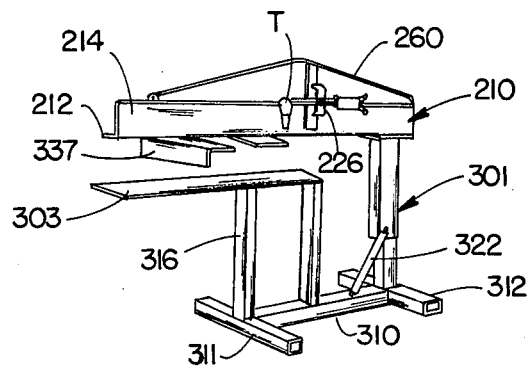
FIG. 16 is a perspective view of the bench, with the torch guide assembled thereon, and shown in partially raised position with small articles to be cut magnetically attached to the lower side of the torch guide.

For purposes of description herein, the terms "upper," "lower," "right," "left," "rear," "front," "vertical," "horizontal" and derivatives thereof shall relate to the invention as oriented in FIGS. 1, 10 and 11. However, it is to be understood that the invention may assume various alternative orientations, except where expressly specified to the contrary.

Referring now specifically to FIGS. 1-6 of the drawings, the torch guide 10 depicted includes an elongated support base 12 having upstanding from one edge thereof an elongated carriage track 14. These two members are preferably the flanges of a piece of angle iron stock such that the horizontal flange forms the support base and vertical flange forms the carriage track. At spaced intervals along the support base is a plurality of openings 16. Through each opening extend the two polar ends of a magnet 18 so as to be generally coplanar with bottom surface 12' of support base 12. Each of the series of magnets is retained in position by a semicylindrical upstanding retainer 20, as of sheet metal or the like, having its ends secured to the support base astraddle of the opening, with the magnet attached to the retainer by a bolt or other fastener 22.

Positioned on and straddling track 14 is an inverted U-shaped slide carriage 24 having an upstanding torch mount subassembly 26 thereon. The torch mount subassembly may include a backplate 28, a torch receiving clip 30, and a bolted clamp 32, or the equivalent, to enable a conventional torch to be held, for example, in the orientation of the torch T. It can be moved as represented by the phantom line in FIG. 2. The torch may be attached and removed by fastener 34 such as a bolt subassembly.

Extending longitudinally of the elongated structure, parallel to the support base and the track is a threaded feed screw 36. One end 36' thereof extends through and is supported by bearing plate 38 attached as by weldment to the adjacent end of base 12 and extending upwardly therefrom perpendicular to the flange forming carriage track 14. The interfit between end 36' and bearing 38 has sufficient clearance to allow the lead screw 36 to be angularly tilted from its normal horizontal orientation depicted through a limited small acute angle to base 12 as represented by the center lines in FIG. 1. Outwardly of bearing 38 on the lead screw is a manual screw actuator handle 40 radially offset and preferably of L-shaped configuration to allow the screw to be manually rotated. At the opposite end 36'' from end 36' of lead screw 36 is a cylindrical bearing portion cooperative with a retractable bearing assembly.

More specifically, a cylindrical sleeve 44 oriented in axial alignment with the lead screw, and particularly with the adjacent cylindrical bearing end portion 36'' thereof, has a cylindrical bearing cavity 46 in its end capable of receiving and loosely fitting over bearing surface 36''. Sleeve 44 is axially shiftable within a fixed outer sleeve 48 securely attached to base 12 by pillar 50. Sleeve 44 is slidably adjustable and retainable in a particular position in sleeve 48 by a pin and slot interconnection therebetween. That is, an axially elongated slot 48a in sleeve 48 has a pair of axially spaced transverse slots 48b and 48c extending therefrom to allow a radial pin 52 extending from inner sleeve 44 to be manually adjusted along slot 48a into either of slots 48b or 48c. This enables cylindrical opening 46 to be placed over and in supporting relationship with bearing surface 36", or retracted away therefrom.

Carriage 24 is drivingly interconnectable with the lead screw by means of a threaded member 56 which extends around 180° or less of the lower peripheral part of an axial portion of lead screw 36, with the lead screw resting therein. The threaded interengagement of this member 56 with the lead screw 36, assisted by the weight of the lead screw, causes the member and thus the carriage to be advanced when the screw is rotated. This threaded member 56 may be attached to carriage 24 by an intermediate flange 58 secured to both.

Retraction of bearing support sleeve 44 from end 36" of the feed screw, and the releasable connection of the threaded member 56 from the feed screw, enables the feed screw to be tilted on bearing 38 and elevated out of driving engagement with threaded member 56 allowing carriage 24 to be quickly manually slid back to the starting position.

To enable the portable unit to be readily carried about, a suitable handle, e.g., inverted U-shaped handle 60, is attached to the assembly, preferably to base 12, positioned so as not to interfere with any of the operative components.

To use the novel apparatus, it is readily carried by handle 60 to the location at which stock is to be cut, e.g., in a storage yard, positioned in proper orientation on the stock to be cut, preferably using an edge of support 12 to align the unit with a straight line to be cut, the magnets holding it in position, mounting a torch T in torch mount subassembly 26 with its discharge nozzle oriented downwardly toward the stock, and with carriage 24 at the start position closest to actuating handle 40.

The lead screw 36 rests in functional interrelationship with threaded drive member 56, and bearing sleeve 44 is placed in supporting relation to end 36" of lead screw 36. The unit is then ready for operation. After the torch is lit, the carriage and torch are manually advanced at a controlled rate necessary for the thickness of the stock by rotating screw actuator 40 and thus lead screw 36 to drive threaded member 56 and carriage 24 with torch T along a line parallel to elongated track 14. At the end of the cut, bearing sleeve 44 is retracted using radial pin 52 to slide sleeve 44 back in sleeve 48, screw 36 is tilted by raising end 36" to release its connection with threaded member 56, and carriage 24 is manually slid back to its initial position. A second cut can then be taken either by adjusting the angular mounting of torch T or moving the assembly by simply lifting it and placing it in the new desired location. There is no need to haul heavy stock into a shop or other processing area. There is no necessity for electrical power. The unit has proven to operate quickly, efficiently, and accurately for many types of stock, serving as a handy, inexpensive tool for the smaller welding shops or farm usage.

Referring now specifically to FIGS. 7–9, the modified assembly 110 there depicted includes an elongated support base 112 having an upstanding edge forming an elongated carriage track 114 comparable to that in FIG. 1. The support base includes a plurality of magnetic retention elements 118 of the type depicted in FIGS. 1 and 2. Positioned on track 114 is an inverted U-shaped slide carriage 124 having an upstanding torch mount subassembly 126 thereon.

Extending longitudinally of the structure, parallel to the support base and track, is the elongated feed screw 136 supported in bearing plates 136' and 136" at opposite ends of the screw. Outwardly of the bearing plate 136' is a manual screw actuator handle of the L-shaped or crank-type 140 to allow the screw to be manually rotated.

Carriage 124 is drivingly interconnectable with the lead screw by a threaded half nut 156 which engages a peripheral portion 180° or less of the lead screw, and is mounted on a bracket 157 which is pivotally attached at 159 to the carriage 124. Element 156 is biased into threaded engagement with the screw shaft by a compression spring 161 between bracket 157 and carriage 124, spaced from pivot 159.

Rotation of crank handle 140 thereby rotates lead screw 136, causing torch carriage 124 to be moved along track 114 by the threaded engagement of element 156 with the lead screw. Quick return of the carriage can be achieved by depressing threaded member 156 out of engagement with the lead screw, against the bias of compression spring 161, and sliding the carriage to the desired position.

The alternative potential position of the threaded member and its support is depicted in phantom lines in FIG. 7 at 156' and 157'.

To enable the portable unit to be readily carried about, a suitable handle 160 (portrayed in phantom) is employed.

The torch is retained on subassembly 126 by clamping it between upstanding plate 128 and adjacent bracket 129 held to the plate by threaded fastener 134.

The function of this modified apparatus will be readily understood from the above description and that of the first embodiment. After the torch is mounted, operation of the crank advances the carriage and torch along the lead screw. At the end of the pass, threaded follower 156 is depressed, i.e., shifted away from the lead screw to release the connection, thereby allowing the follower, carriage and torch to be returned to the starting position.

Referring now specifically to FIG. 10, the third embodiment of the present torch guide is substantially similar to the previously described structure, and is particularly adapted for use in conjunction with the accessories described hereinbelow. Hence, similar parts appearing in the torch guide illustrated in FIG. 10 are represented by the same, corresponding reference numeral as the previously described torch guides of FIGS. 1–6 and 7–9, except for the prefix digit "2" in the reference designations of the latter. In other words, the support base 12 of FIGS. 1–6 corresponds to the support base 112 of FIGS. 7–9, and 212 of FIGS. 10–33.

The handle 260 (FIG. 10) of torch guide 210 is generally bow-shaped, and extends between end walls 236" and 236". A post 270 is attached to and extends upwardly from base 212 on that end of guide 210 opposite crank 240. Preferably, post 270 has a noncircular transverse cross-sectional shape, and in this example comprises a square rod which extends slightly above the rear guide flange 214.

With reference to FIGS. 11–16, a stand 301 is provided for supporting portable torch guide 210 thereon, and comprises base 302 adapted to be abuttingly supported on a floor or other similar surface. A platform 303 is connected with and supported above base 302 at a preselected, convenient working height. Platform 304 is normally horizontally oriented, and is shaped to abuttingly support thereon articles to cut. A pedestal 304 has a lower end connected with base 302, and an upper end carrying a fastener mechanism 305 for detachably supporting torch guide 210 thereon, and positioning the same over at least a portion of platform 203 at an elevation substantially level with or above the height of the platform.

In the illustrated example, base 302 has an I-shaped plan configuration comprising a central, tubular beam 310, with a pair of lateral extending tubular beams 311 and 312 attached to the ends of beams 310 to form support legs. Feet 313 depend from the lower surface of the ends of lateral beams 311 to provide additional stability.

Platform 303 has a generally rectangular plan shape, and is supported above base 302 by a pair of laterally spaced apart posts 316 and 317. The ends of posts 316 and 317 are fixedly attached to the upper surface of central beam 310 and the lower surface of platform 303 by suitable means such as welds or the like. In the illustrated example, forward post 316 extends upwardly from the intersection of forward beam 311 and central beam 310, and rearward post 317 extends upwardly from a generally medial portion of central beam 310. As best illustrated in FIG. 12, platform 303 is positioned slightly off center, to the rear of the longitudinal axis of base 302 for purposes to be described in greater detail hereinafter. Preferably, the upper surface of platform 303 is positioned at an elevation of approximately 24-36 inches.

Fastener mechanism 305 is preferably vertically adjustable. In this example, pedestal 304 comprises first and second telescope tubes 320 and 321. The lower end of inner tube 321 is fixedly attached to the central beam 310 of base 302 at the intersection of central beam 310 and rear cross beam 312, and extends substantially perpendicularly therefrom. Outer tube 320 is closely received over inner tube 321, and has fastener mechanism 305 attached to the upper end thereof. An adjustment arm 322 is pivotally attached to the lower end of outer tube 320 by a clevis bracket 323 and pin 324. A kick plate 325 is attached to the mid-portion of adjustment arm 322, and extends laterally therefrom to facilitate foot operation of the adjustment arm. A stop or chock 326 is fixedly attached to central beam 310, and is adapted for selective engagement with the free end 327 of adjustment arm 322 to retain pedestal 304 in a partially raised position. To retain pedestal 304 in a fully raised position (FIG. 15), upper tube 320 is raised, and adjustment arm 322 is rotated counterclockwise (as illustrated in FIGS. 11 and 15) until it assumes a substantially vertical orientation, wherein the free end 327 of the adjustment arm engages the upper surface of central beam 310. In this orientation, pedestal 304 is securely locked in the fully raised position. To shift pedestal 304 to a lowered position (FIG. 13), adjustment arm 322 is rotated in a clockwise fashion (as oriented in FIGS. 13 and 15) over chock 326, thereby permitting tubes 320 and 321 to telescope into fully collapsed position. A stop 342 (FIG. 14) prevents pedestal tubes 320 and 321 from inadvertently separating, and compromises a stud 343 having its lower end anchored to cross beam 312 and a nut 344 connected with the threaded, upper end. A slide tab 345, connected with tube 320, is threaded over stud 343 and reciprocates thereon as pedestal 304 is vertically adjusted. Abutment between slide tab 345 and nut 344 prevents tubes 320 and 321 from being disassembled.

Fastener mechanism 305 comprises virtually any suitable means for detachably connecting torch guide 310 with the upper end of pedestal 304 to mount the same in a cantilevered fashion over platform 303. Preferably, fastener mechanism 305 comprises a C-shaped channel 330, having upper and lower flanges 331 and 332 forming a slot 333 into which the base rail 212 of torch guide 210 is closely received. Suitable fasteners, such as thumb screws 334, are mounted in upper flange 331, and are tightened against guide base 212 to securely interconnect the same in channel 330. Upper flange 331 is slightly narrower than lower flange 332 to facilitate insertion of guide base 212 into channel slot 333.

In operation, torch guide 210 is assembled onto stand 310 by inserting the base flange 212 at the handle end 240 of the torch guide into the slot 333 of mounting channel 330. Torch guide 210 is then adjusted into proper position, so that it extends substantially parallel with the longitudinal axis of platform 303. The rearward offset of platform 303 positions the cutting torch T when mounted in holder 226 a spaced apart distance from the operator edge of the platform, so that articles supported on platform 303 can be easily cut along a straight line without cutting through or otherwise damaging the platform itself. Thumb screws 334 are then tightened down against that portion of the guide flange disposed in channel 330, so as to securely retain the torch guide in place, in a cantilevered condition over platform 303.

As shown in FIG. 16, relatively small, lightweight articles 337, such as an angle iron, bar sections, and the like, can be cut by positioning stand 301 in the partially raised position wherein adjustment arm 322 is engaged against chock 326. In the partially raised position, space is formed between the torch guide 210 and platform 303, so that lightweight articles 337 can be magnetically attached to the lower surface of the torch guide and quickly cut by translation of torch T across the article.

Figure 17:
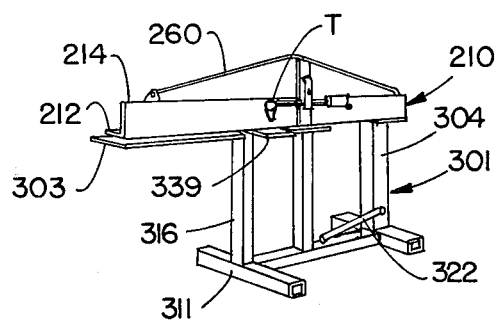
FIG. 17 is a perspective view of the bench and torch guide shown in FIG. 16, illustrated in the lowered position, wherein an article to be cut is clamped between the torch guide and a platform portion of the bench.

As shown in FIG. 17, heavier articles 239 can be easily cut by placing the same on platform 303, and then lowering stand 301 to the collapsed position, so that the weight of the torch guide 210 clamps article 339 between the lower surface of the torch guide and the upper surface of platform 303. The torch carriage 324 is then manipulated so as to pass torch T over the clamped article, and cut the same to the desired length and/or angle.

A pipe cutter attachment 350 is illustrated in FIGS. 18-22 and comprises first and second stands or holders 351 and 352 for supporting opposite ends of a section of pipe 353 thereon. Each of the stands 351 and 352 include a pair of verticaly oriented wheels or discs 354 and 355 rotatably mounted in a side-by-side relationship. Discs 354 and 355 have peripheral edges 356 disposed adjacent one another for abuttingly supporting the section of pipe 353 thereon. At least one of the stands 351 and 352 includes means for rotating both discs mounted thereon in the same direction and at the same speed, thereby evenly rotating pipe segment 353 beneath the cutting torch T.

Figure 18:
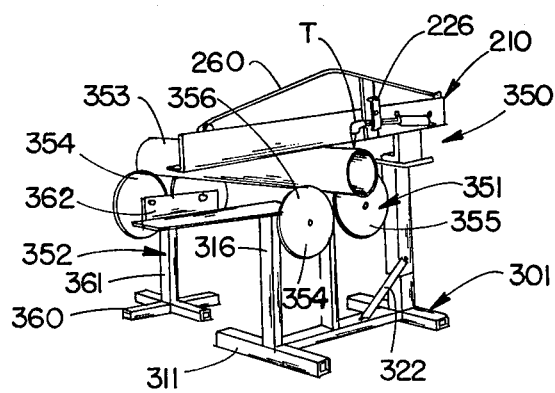
FIG. 18 is a perspective view of a pipe cutter attachment.
Figure 19:
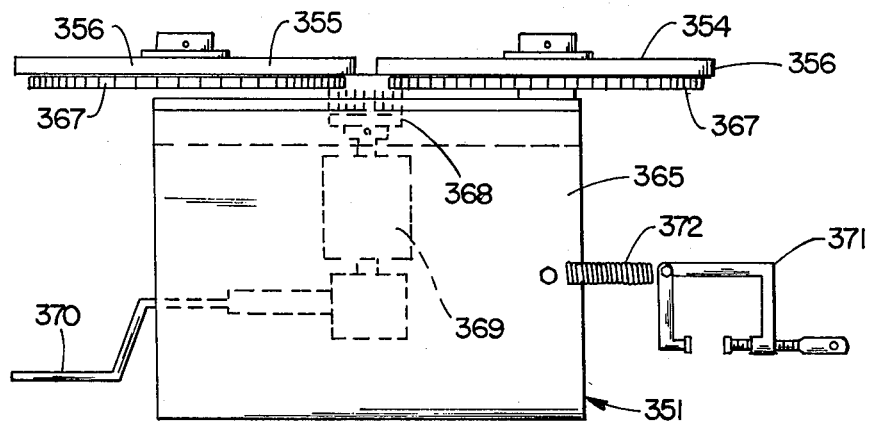
FIG. 19 is a top plan view of a pipe cutter support assembly, with a drive mechanism thereon.
Figure 20:
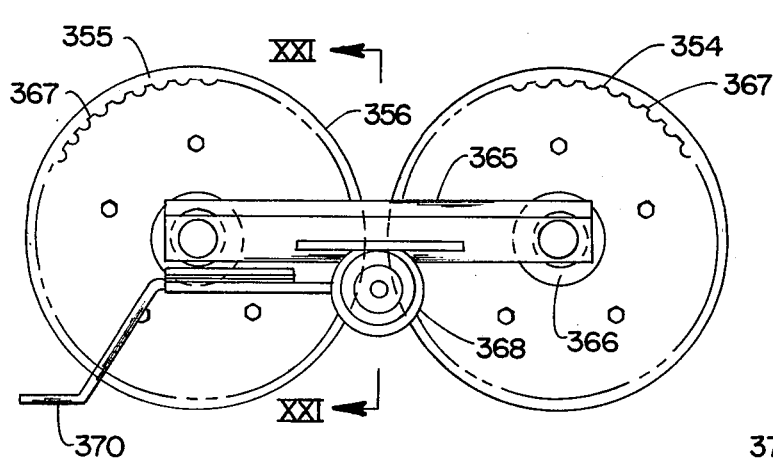
FIG. 20 is a rear elevational view of the pipe support illustrated in FIG. 19.
Figure 21:
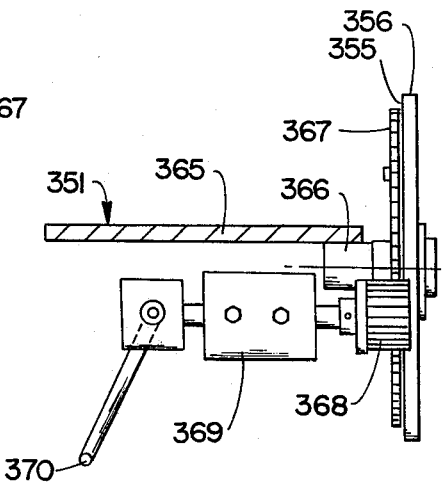
FIG. 21 is a vertical cross-sectional view of the driven pipe support, taken along the line XXI—XXI of FIG. 20.

As best illustrated in FIG. 18, the rearward pipe cutter stand 352 merely supports the associated end of pipe section 353 thereon in a substantially horizontal orientation, and permits the pipe section to rotate on discs 354 and 355. Stand 352 comprises an X-shaped base 360, with an upstanding pedestal 361 on which a frame 362 is connected. Discs 354 and 355 are mounted for free rotation on frame 362, in the nature of idler wheels.

The forward pipe cutter stand 351 (FIGS. 19-21) comprises a plate-shaped base 365 adapted for abutting support on platform 303. Suitable pillow block bearings 366 are attached to the lower surface of base 365, and rotatably mount corresponding discs 354 and 355 therein in a side-by-side relationship. The drive mechanism for the discs 354 and 355 of stand 351 includes a pair of gears 367 attached to the interior sides of the discs in a concentric relationship therewith. A drive gear 368 is positioned between gears 367 and engages the same, whereby rotation of drive gear 368 simultaneously and positively rotates gears 367, and hence discs 354 and 355, in the same direction at the same speed. A manually driven, mechanical speed reducer 369 is connected with and rotates drive gear 368, and includes a hand crank 370 which extends outwardly from the side edge of base 365 in a direction generally perpendicular to the axis of rotation of discs 354 and 355. A C-clamp 371 is provided for attaching stand 351 to bench platform 303, and is tethered to base 360 by a coil spring 372.

Stand 351 is attached to stand platform 303 in the manner illustrated in FIG. 18, by positioning discs 354 and 355 on the forward side of the platform, and attaching the same thereto by tightening C-clamp 371. The idler stand 352 is then positioned in line with drive stand 351, so that pipe segment 353 extends substantially perpendicular to the central axis of the cutting line of torch T.

Figure 22:
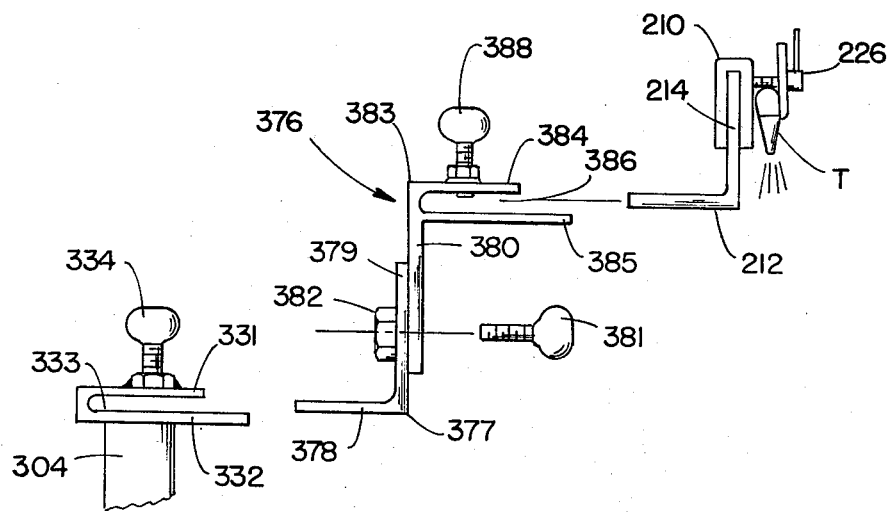
FIG. 22 is an exploded view of a pivot bracket portion of the pipe cutter attachment.

As best illustrated in FIG. 22, pipe cutter attachment 350 further includes a swivel bracket 376 for pivotally connecting cutting torch guide 210 with stand 301. Swivel bracket 376 comprises an L-shaped member 377 having a horizontal flange adapted for reception into slot 333 in the mounting channel 330 on stand pedestal 304. The vertical flange 379 of L-shaped member 377 is pivotally attached to a connector bracket 380 by a suitable fastener arrangement, such as the illustrated thumb screw 381 and nut 382. The upper end of bracket 383 is shaped substantially identical with mounting channel 330, and includes a pair of flanges 384 and 385 which form a slot 386 therebetween in which the base 212 of torch guide 210 is closely received. A pair of thumb screws 388, or other similar fasteners, are mounted on upper flange 384, and when tightened, securely lock torch guide 210 in swivel bracket 376.

As best illustrated in FIG. 18, when the pipe cutter attachment 350 is used, torch guide 210 is attached to pedestal 304 by swivel bracket 376. The angular orientation of torch guide 210 is adjustable with respect to platform 303 by simply loosening thumb screw 381, and pivoting the torch guide to the selected position, then retightening thumb screw 381. The angular adjustability of torch guide 210 permits the same to be used in conjunction with a wide variety of different diameter pipe sections. In a like manner, the side-by-side arrangement of discs 354 and 355 permits a wide variety of different size pipes to be supported thereon and rotated beneath torch T. The pipe section 353 is shifted longitudinally on stands 351 and 352 until the end portion to be cut off from the pipe section is properly positioned underneath torch T. The torch is then lit, and positioned over tube 352 at a proper cutting height, and crank 370 is then rotated so that pipe section 353 rotates underneath the torch, cutting through the pipe sidewall until the selected end segment is bodily severed from the pipe.

Figure 23:
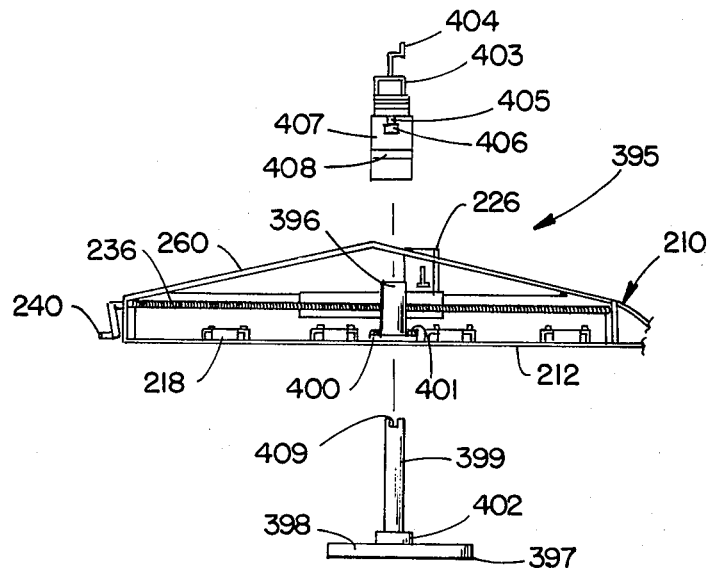
FIG. 23 is an exploded, elevational view of a disc cutter attachment for large circles.
Figure 24:
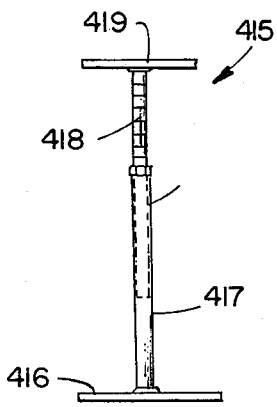
FIG. 24 is an elevational view of a vertically adjustable support for the disc cutter attachment shown in FIG. 23.
Figure 25:
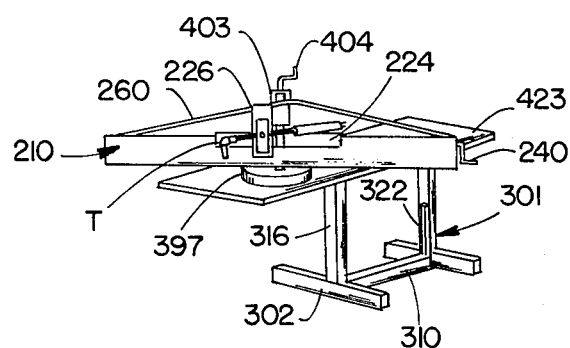
FIG. 25 is a perspective view of the disc cutter attachment shown in FIG. 23, supported on the bench.
Figure 32:
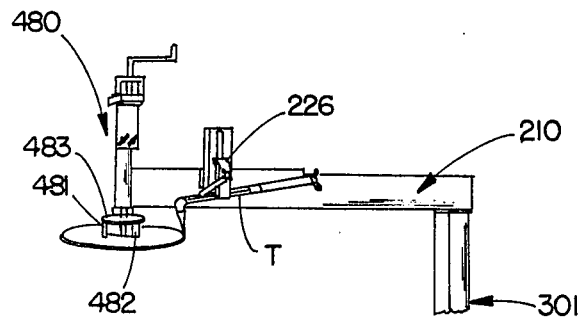
FIG. 32 is a perspective view of a disc cutter attachment for small circles, shown connected with the torch guide and bench.
Figure 33:
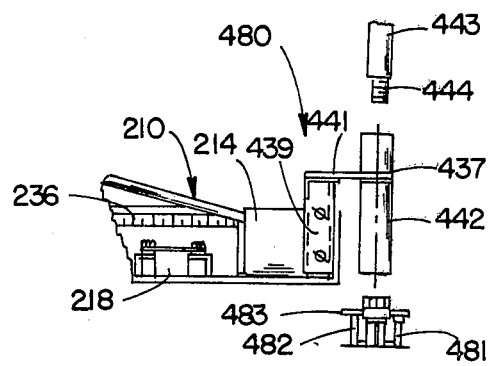
FIG. 33 is a fragmentary, exploded elevational view of the disc cutter attachment shown in FIG. 32.

FIGS. 23–25 illustrate an attachment 395 for cutting large arcs, circles and the like, and comprises a sleeve bearing 396 detachably mounted on a medial portion of the torch guide base 212, and a pivotal support 397, having a base 98 with magnetic means for detachably connecting the pivotal support with a ferro-magnetic metallic stock, and a spindle 399 upstanding from base 398, and being shaped for mating reception in sleeve bearing 396.

In the illustrated example, torch guide base 212 includes an aperture therethrough which mates with the aperture extending through sleeve bearing 396. Sleeve bearing 396 includes a collar 400 to connect the sleeve bearing with torch guide base 212 by fasteners 401. Pivot base 398 includes a raised bearing surface 402 that abuttingly engages the lower surface of torch guide base 212, and facilitates smooth, easy rotation of torch guide 210 about spindle 399. Sleeve bearing 396 includes open ends, with a length sized so that the upper end of spindle 399 protrudes from the corresponding end of the sleeve bearing.

A mechanism is provided for rotating torch guide 210 about spindle 399, and in this example comprises a manually driven speed reducer 403, comprising a hand operated crank 404, and a drive shaft 405 with a key 406 mounted thereon. Speed reducer 403 is mounted on a plate 407, having a U-bolt 408 disposed adjacent the lower end thereof. The upper end of spindle 399 includes a notch 409 which mates with key 406 to rotationally interconnect the same.

In operation, support 497 is placed on the article to be cut, and the magnetic material in base 398 securely anchors the same in place. Torch guide 210 is then assembled onto support 397 by positioning sleeve bearing 396 over spindle 399. Speed reducer 403 is attached to the assembly by positioning U-bolt 408 over the exterior surface of sleeve bearing 396, and translating the same downwardly until key 406 engages slot 409. U-bolt 408 is then tightened to interconnect speed reducer 403 with torch guide 210. Torch guide handle 240 is then manipulated to position the torch at the diameter selected to be cut. Rotation of crank 404 rotates speed reducer 403 and torch guide 210 with respect to spindle 399, thereby rotating the torch along an arcuate path to cut disc-shaped objects and the like.

A support for arc cutting attachment 395 is illustrated in FIG. 24, and comprises a base 416, with an upstanding column 17 attached thereto in which a threaded stud 418 is received. A disc-shaped platform 419 is attached to the upper end of stud 418, and is adapted to support an article to be cut thereon. Rotation of platform 14 adjusts the vertical height of the support surface.

As best illustrated in FIG. 25, arc cutting attachment 395 can also be used in conjunction with stand 301 to cut rounded ends on plates and the like. The platform 303 of stand 301 is first raised to a convenient working height, and the article whose end is to be cut, such as plate 423, is set on the upper surface of platform 303. Pivotal support 397 is then positioned on the selected portion of plate 423, and torch guide handle 240 is manipulated to locate torch T in the position required to cut the desired diameter arc. Crank 404 is then manipulated so that torch T is rotated along the desired arcuate path.

Another attachment 430 is illustrated in FIGS. 26–31, and is particularly adapted for making arcuate cuts. Attachment 430 includes a lateral extension arm 431 having a square tube 432 attached to one end, and adapted to receive therein post 270. A pair of thumb screws 433 are mounted on tube 432 to detachably connect extension arm 431 with torch guide 210. The opposite end of extension arm 431 includes an upwardly extending post 434, which is similar to post 270, and has a square transverse cross-sectional shape. The medial portion of extension arm 431 comprises a rigid strap 435 which is attached to tube 432 and post 434 by suitable fasteners, such as bolts 436.

A bracket 437 mounts a torch carrying pivot arm 438 to the outer end of extension arm 431, and comprises a tubular sleeve 439 adapted to be closely received over square post 434. Suitable fasteners, such as set screws 440, are mounted on sleeve 439 to secure bracket 434 on extension arm 431. A plate 441 is fixedly attached to the upper end of sleeve 439, and supports a vertically extending, cylindrical sleeve 442 thereon. A shaft 443 is rotatably mounted in sleeve 442, and includes a threaded lower end 444, and a collar 445 at the upper end which is adapted to abut the upper end of sleeve 442 and thereby retain shaft 443 in place. A non-cylindrical key 446 is attached to the upper end of shaft 443 for purposes to be described in greater detail hereinafter.

Pivot arm 438 has a laterally adjustable, tubular construction, comprising a square tubular portion 450 and a telescopingly, mating bar 451. A set screw 452 selectively interconnects arm members 450 and 451 in the desired position. Tubular arm member 450 is detachably connected with the threaded end 444 of shaft 433 by a nut 453 fixedly connected with the upper surface of arm 450. A torch retaining bracket 454 is pivotally attached to the outer end of adjustable arm bar 451, and includes a pivot fastener 455, an L-shaped mount 456, and a torch clamp 457. Bracket 454 permits pivot arm 438 to rotate with respect to the torch T.

Pivot arm 438 is driven by the manual speed reducer 403 previously described in conjunction with cutter attachment 395 (FIGS. 23-25). An adapter 460 is provided to rotatably connect the keyed end 406 of drive shaft 405 with the keyed end 446 of shaft 443. When assembled U-bolt 408 is threaded over the upper end of sleeve 442 and tightened thereon, such that rotation of crank 404 rotates shaft 443 and pivot arm 438 with respect to torch guide 210.

Arc cutter attachment 430 further includes a hose support 465 (FIG. 31) comprising a housing 466 which is detachably clamped to the rear flange 214 of torch guide 210. An arm 467 has its inner end pivotally mounted in housing 466, and a free end 469, having a concave bend 470 in which the torch hoses are retained. Housing 466 has a forked-shaped body which stradles torch guide flange 204, and includes an outrigger arm 471 with an adjustable foot 472 which stabilizes the torch guide 210, and also provides means for adjusting the height of the torch tip.

In operation, torch guide 210 can be assembled onto bench 301 as previously described, and shown in FIGS. 29 and 30, with the bench situated in one of the raised positions. However, it is preferred that torch guide 210 be placed directly onto the plate to be cut, with magnets 218 retaining the guide in place. Arc cutting attachment 430 is then assembled in the manner described above, with torch T positioned in clamp 457, with the handle of the torch preferably oriented toward the handle end 240 of the torch guide. Pivot arm 438 is laterally adjusted to achieve the desired cutting diameter. The torch hoses 475 are positioned in the concave bend 470 of support arm 467. After the torch has been lit, arcuate cutting is performed by manual rotation of crank 404, which in turn rotates torch T along an arcuate path. The pivotally mounted torch bracket 454 permits torch T to remain in a substantially parallel relationship with the torch guide to avoid interference with other portions of the machine. Pivotally mounted hose support arm 467 permits hoses 475 to reciprocate as the tip of torch T is moved along an arcuate path.

An attachment 480 (FIGS. 32-33) for cutting small diameter circles, discs, arcs and the like, is somewhat similar to the above-described attachment 430, and uses the same bracket 437, drive shaft 443, and speed reducer drive 403. The sleeve 439 of bracket 437 is attached directly to post 240, and a magnetic head 481 is attached to the threaded end 444 of shaft 443. In this example, magnetic head 441 includes a plurality of magnetic elements 482 which are interconnected with a circular collar 483.

In operation a relatively lightweight article 485 is attached to magnetic head 481. Torch guide handle 240 is then manipulated so that the torch is located a predetermined distance from the rotational axis of head 481 to cut the desired arc. After torch T has been lit, the user manually rotates crank 404, thereby turning article 45 under the torch.

Figure 34:
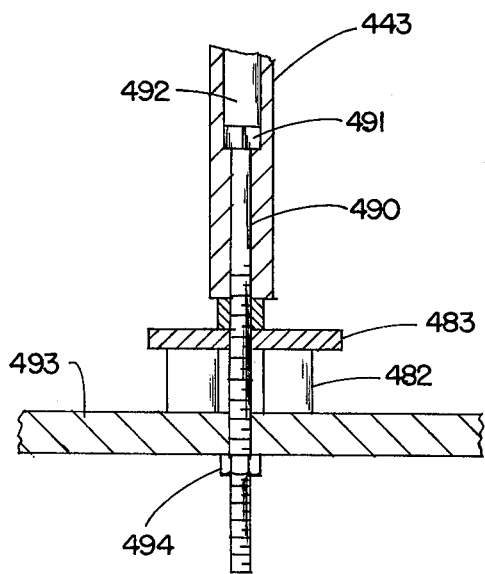
FIG. 34 is a fragmentary, vertical cross-sectional view of another embodiment of the disc cutter attachment shown in FIG. 32.

In the embodiment shown in FIG. 34, larger plates can be attached to circle cutter 480 by a bolt 490, having a square head 491 which is received and held in place against rotation in an aperture 492. Bolt 490 extends through a mating aperture in the collar 483 of magnetic head 481. An article 493 is attached to the cutter 480 by forming a hole through the plate, inserting bolt 490 through the hole, and tightening nut 495, so that the plate is drawn tightly against the magnetic elements 482. In operation, the user can quickly detach torch guide 210 from stand 301, and attach the same by magnets 218 to a piece of metal anywhere inside or even outside the shop.

From the foregoing description, it will be readily appreciated by those skilled in the art, that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A stand for supporting a portable cutting torch guide comprising:
   a base adapted to be abuttingly supported on a surface;
   a platform connected with and supported above said base at a preselected, convenient working height; said platform being normally horizontally oriented, and shaped to abuttingly support thereon articles to be cut; and
   a pedestal having one end connected with said base, and the other end including means for detachably supporting the cutting torch guide thereon, and positioning the cutting torch guide over at least a portion of said platform, at an elevation substantially level with or above the height of said platform.

2. A stand as set forth in claim 1 wherein:
   said pedestal includes means for vertically adjusting the same between a lowered position, wherein said pedestal retains the cutting torch guide substantially level with said platform, and at least one raised position, wherein said pedestal retains the cutting torch guide a predetermined, spaced apart distance above said platform.

3. A stand as set forth in claim 2, wherein said vertical adjusting means comprises:
first and second telescoping tubes which define said pedestal; one of said tubes being fixedly attached to and upstanding from said base, and the other of said tubes being slidingly connected with the fixed one of said tubes; said tubes being collapsed in said first position;
an adjustment arm having one end pivotally connected with the sliding one of said tubes;
a chock mounted on said base at a location thereon adapted for selective engagement with a free end of said adjustment arm;
said adjustment arm having a length selected so that engagement of said adjustment arm with said chock positively retains the cutting torch guide in a first, raised position.

4. A stand at set forth in claim 3 wherein:
said adjustment arm is mounted for rotation into a substantially vertical orientation, wherein the free end of said adjustment arm abuts said base to positively retain the cutting torch guide in a second, raised position, disposed above the first raised position.

5. A stand as set forth in claim 4 wherein:
said base has an I-shaped plan configuration for lateral stability.

6. A stand as set forth in claim 5 wherein:
said platform is supported on a pair of laterally spaced apart posts, fixedly attached to and upstanding from said base.

7. A stand as set forth in claim 6 wherein said detachable supporting means for the cutting torch guide comprises:
a C-shaped channel mounted on said pedestal other end, and shaped to closely receive a mating plate portion of the cutting torch guide therein; and
fastening means for selectively retaining the plate portion of the cutting torch in said C-shaped channel.

8. A stand as set forth in claim 7 wherein:
said fastening means comprises a pair of thumb screws threadedly mounted in an upper flange of said C-shaped channel.

9. A stand as set forth in claim 8 including:
a stop connected with said first and second tubes for preventing inadvertent separation of said tubes.

10. A stand as set forth in claim 1 wherein:
said base has an I-shaped plan configuration for lateral stability.

11. A stand as set forth in claim 1 wherein:
said platform is supported on a pair of laterally spaced apart posts, fixedly attached to and upstanding from said base.

12. A stand as set forth in claim 1 wherein said detachable supporting means for the cutting torch guide comprises:
a C-shaped channel mounted on said pedestal other end, and shaped to closely receive a mating plate portion of the cutting torch guide wherein; and
fastening means for selectively retaining the plate portion of the cutting torch in said C-shaped channel.

13. In combination, a portable cutting torch guide and stand therefor, said stand comprising:
a base adapted to be abuttingly supported on a surface;
a platform connected with and supported above said base at a preselected, convenient working height; said platform being normally horizontally oriented, and shaped to abuttingly support thereon articles to be cut; and
a pedestal having one end connected with said base, and the other end including means for detachably supporting said cutting torch guide, and positioning said cutting torch guide over at least a portion of said platform, at an elevation substantially level with or above the height of said platform.

14. The combination set forth in claim 13 wherein:
said pedestal includes means for vertically adjusting the same between a lowered position, wherein said pedestal retains said cutting torch guide substantially level with said platform, and at least one raised position, wherein said pedestal retains said cutting torch guide a predetermined spaced apart distance above said platform.

15. The combination as set forth in claim 14 wherein said detachable supporting means for said cutting torch guide comprises:
a C-shaped channel mounted on said pedestal other end, and shaped to closely receive a mating plate portion of said cutting torch guide therein; and
fastening means for selectively retaining the plate portion of the cutting torch in said C-shaped channel.

16. The combination as set forth in claim 15 wherein:
said adjustment arm is mounted for rotation into a substantially vertical orientation, wherein the free end of said adjustment arm abuts said base to positively retain said cutting torch guide in a second, raised position, disposed above the first raised position.

17. The combination as set forth in claim 13 wherein said detachable supporting means for said cutting torch guide comprises:
a C-shaped channel mounted on said pedestal other end, and shaped to closely receive a mating plate portion of the said cutting torch guide therein; and
fastening means for selectively retaining the plate portion of the cutting torch in said C-shaped channel.

18. The combination as set forth in claim 13 wherein:
said portable cutting torch guide includes retention magnets attached to a base portion of said guide and oriented to engage ferro-magnetic metallic stock to be cut;
said pedestal includes means for vertically adjusting the same between a first position, wherein the base of said guide and said platform are substantially level to clamp articles to be cut therebetween, and a second position, wherein the base of said guide is positioned a predetermined, spaced apart distance above said platform to provide clearance in which articles attached to the base of said guide by said magnets depend from said guide.

19. The combination set forth in claim 18 wherein said vertical adjusting means comprises:
first and second telescoping tubes which define said pedestal; one of said tubes being fixedly attached to and upstanding from said base, and the other of said tubes being slidingly connected with the fixed one of said tubes; said tubes being collapsed in said first position;
an adjustment arm having one end pivotally connected with the sliding one of said pedestal tubes;

a chock mounted on said base at a location thereon adapted for selective engagement with a free end of said adjustment arm;

said adjustment arm having a length selected so that engagement of said adjustment arm with said chock positively retains the cutting torch guide in a first, raised position.

20. A pipe cutter attachment for torch cutters of the type having means for supporting a cutting torch at a selected stationary position; said attachment comprising:

first and second stands for supporting opposite ends of a section of pipe thereon; each of said stands having a frame, with a pair of vertically oriented discs rotatably mounted thereon in a side-by-side relationship; said discs having peripheral edges disposed adjacent one another for abuttingly supporting the section of pipe thereon;

at least one of said stands including means for rotating the discs mounted thereon in the same direction and at the same speed, thereby rotating the pipe segment supported thereon beneath the cutting torch.

21. A pipe cutter attachment as set forth in claim 20 wherein said disc rotating means includes:

a pair of gears connected with corresponding sides of said discs; and a drive gear positioned between said pair of gears and engaging the same, whereby rotation of said drive gear rotates said pair of gears.

22. A pipe cutter attachment as set forth in claim 21 wherein said disc rotating means further includes:

a manually driven, mechanical speed reducer connected with and rotating said drive gear.

23. A pipe cutter attachment as set forth in claim 22 wherein:

said one stand frame includes a plate adapted to be supported on a planar surface, and a C-clamp shaped to selectively anchor said one stand to the planar surface.

24. A pipe cutter attachment as set forth in claim 23 wherein:

said C-clamp is tethered to said one frame plate by a coil spring; and said speed reducer includes a crank which extends generally perpendicular to the axes of rotation of said discs.

25. A pipe cutting device comprising:

a portable cutting torch guide;

a stand for supporting said torch and guide comprising:

a base adapted to be abuttingly supported on a surface;

a platform connected with and supported above said base at a preselected, convenient working height; said plate form being normally horizontally oriented and shaped to abuttingly support thereon articles to be cut; and a pedestal having one end connected with said base, and the other end including means for detachably supporting said cutting torch guide and positioning said cutting torch guide over at least a portion of said platform, at an elevation substantially level with or above the height of said platform;

a pipe cutter attachment comprising:

first and second rotary supports for supporting opposite ends of a section of pipe thereon; each of said supports having a frame, with a pair of vertically oriented discs rotatably mounted thereon in a side-by-side relationship; said discs having peripheral edges disposed adjacent one another for abuttingly supporting the section of pipe thereon;

at least one of said supports having means for detachably connecting the same with the platform of said stand, and including means for rotating the discs mounted thereon in the same direction and at the same speed for rotating the pipe segment supported thereon beneath the cutting torch.

26. The pipe cutting device as set forth in claim 25 including:

a swivel bracket pivotally connecting said cutting torch guide with said stand.

27. The pipe cutting device as set forth in claim 26 wherein:

said one support is mounted on a plate adapted to set on an upper surface of said platform;

said support detachable connecting means comprises a C-clamp shaped to selectively clamp said one support plate on said platform, and being tethered to said one support plate by a coil spring.

28. The pipe cutting device as set forth in claim 27 wherein said disc rotating means comprises:

a pair of gears connected with corresponding sides of said discs; and a drive gear positioned between said pair of gears and engaging the same, whereby rotation of said drive gear rotates said pair of gears.

29. The pipe cutting device as set forth in claim 28 wherein:

said disc rotating means comprises a manually driven, mechanical speed reducer, connected with and rotating said drive gear; said speed reducer including a crank which extends generally perpendicular to the axis of of rotation of said discs.

30. A torch support and guide for cutting arcs and the like, comprising:

an elongate base;

an upstanding carriage track extending along said base;

a torch mounting carriage mountable along said carriage track, and having means for mounting a torch thereon;

means for adjustably connecting said torch mounting carriage with said carriage track for selective translation therealong;

a bearing mounted on a medial portion of said support base and having an axis of rotation oriented substantially perpendicular to said guide base;

a pivotal support having a base with magnetic means for detachably connecting said pivotal support with ferro-magnetic, metallic stock, and a spindle upstanding from said pivotal support base and being shaped for mating reception in said bearing; and means for rotating said torch support and guide about said pivotal support.

31. A torch support and guide as set forth in claim 30 wherein:

said rotating means comprises a manually driven speed reducer.

32. A torch support and guide as set forth in claim 31 wherein:

said bearing comprises a sleeve having open ends through which said spindle extends; and said spindle includes a free end with a key therein for detachable connection with a mating portion of said speed reducer.

33. A torch support and guide as set forth in claim 32 wherein:

said speed reducer includes a mounting plate with a U-bolt therein for detachably connecting said speed reducer with said bearing sleeve.

34. A torch support and guide as set forth in claim 33 including:

a vertically adjustable stand adapted to support said base thereon.

35. An apparatus for cutting arcs and the like, comprising:

a stand having means for detachably mounting said portable torch guide thereon;

a torch support arm having means for mounting a torch thereon;

a bracket having means at one end for detachably connecting said bracket with a free end of said torch guide;

means for rotatably connecting said torch support arm with said bracket for rotation about a generally vertically oriented axis;

means for rotating said torch support arm with respect to said bracket about said axis.

36. An apparatus as set forth in claim 35 including:

means for adjusting the lateral position of said torch mounting means with respect to said axis of rotation for cutting various diameter arcs.

37. An apparatus as set forth in claim 36 including:

an extension arm connecting the free end of said torch guide with said bracket in a laterally spaced apart relationship to permit 360° rotation of said torch support arm.

38. An apparatus as set forth in claim 37 wherein:

said torch mounting means includes a pivot joint which permits the torch to assume a substantially stationary angular orientation during rotation of said torch support arm.

39. An apparatus as set forth in claim 38 including:

a torch hose support arm pivotally mounted on said guide and shaped for supporting torch hoses thereon.

40. An apparatus as set forth in claim 39 wherein:

said support arm rotating means comprises a manually driven, mechanical speed reducer.

41. An apparatus as set forth in claim 40 wherein said stand comprises:

a base adapted to be abuttingly supported on a surface;

a platform connected with and supported above said base at a preselected, convenient working height; said platform being normally horizontally oriented, and shaped to abuttingly support thereon articles to be cut; and a pedestal having one end connected with said base, and the other end including means for detachably supporting the cutting torch guide thereon, and positioning the cutting torch guide over at least a portion of said platform, at an elevation substantially level with or above the height of said platform.

42. An apparatus for cutting arcs and the like, comprising:

a stand having means for detachably mounting said portable torch guide thereon;

a bracket having means at one end for detachably connecting said bracket with a free end of said torch guide, and a sleeve bearing at the other end; said sleeve bearing being normally vertically oriented, and having a spindle rotatably mounted therein;

means connected with an upper end of said spindle for rotating said spindle with respect to said sleeve bearing;

a magnetic retainer connected with a lower end of said spindle and adapted to attach thereto ferromagnetic articles to be cut.

43. An apparatus as set forth in claim 42 wherein:

said spindle rotating means comprises a manually driven, mechanical speed reducer.

44. An apparatus as set forth in claim 43 wherein:

said speed reducer includes a mounting plate with a U-bolt therein for detachably connecting said speed reducer with said bearing sleeve.

45. An apparatus as set forth in claim 44 wherein said guide comprises:

an elongate base;

an upstanding carriage track extending along said base;

a torch mounting carriage mountable along said carriage track, and having means for mounting a torch thereon;

means for adjustably connecting said torch mounting carriage with said carriage track for selective translation therealong.

46. A torch cutting kit comprising:

a cutting torch;

a portable torch guide having an elongate base, an upstanding carriage track extending along said base, a torch mounting carriage mountable along said carriage track and having means for mounting said torch thereon, means for adjustably connecting said torch mounting carriage with said carriage track for selective translation therealong, and retention magnets attached to a base portion of said guide and oriented to engage ferro-magnetic, metallic stock to be cut;

a stand for supporting said portable torch guide, including a base adapted to be abuttingly supported on a surface, a platform connected with and supported above said base at a preselected convenient working height, said platform being normally horizontally oriented and shaped to abuttingly support thereon articles to be cut, and a pedestal having one end connected with said base, and the other end including means for detachably supporting said cutting torch guide thereon in a cantilevered fashion over at least a portion of said platform at an elevation substantially level with or above the height of said platform, said pedestal including means for vertically adjusting the same between a lowered position wherein said pedestal retains said torch guide substantially level with said platform, and at least one raised position wherein said pedestal retains said torch guide a predetermined spaced apart distance above said platform;

a pipe cutter attachment including first and second stands for supporting opposite ends of a section of pipe thereon, each of said stands having a frame with a pair of vertically oriented discs rotatably mounted thereon in a side-by-side relationship, said discs having peripheral edges disposed adjacent one another for abuttingly supporting the section of pipe thereon, and at least one of said stands including means for rotating the discs mounted thereon in the same direction and at the same speed thereby rotating the pipe segment supported thereon beneath said cutting torch;

an attachment for cutting large discs and the like, including a sleeve bearing mounted on a medial portion of said support base and having an axis of rotation oriented substantially perpendicular to said support base, a pivotal support having a base with magnetic means for detachably connecting said pivotal support with ferro-magnetic, metallic stock, and a spindle upstanding from said pivotal support base and being shaped for mating reception in said sleeve bearing, and a manually driven speed reducer connected with said sleeve bearing and said spindle for rotating said torch support and guide about said pivotal support;

an arc cutting attachment including a torch support arm having means for pivotally mounting said cutting torch thereon, a bracket having means at one end for detachably connecting said bracket with a free end of said torch guide, a shaft mounted in said bracket and rotatably connecting said torch support arm with said bracket for rotation about a generally vertically oriented axis, means for connecting said manually driven speed reducer with said shaft for rotating said torch support arm with respect to said bracket about said axis; and an attachment for cutting small discs and the like including a magnetic retainer connected with a lower end of said arc cutting shaft, and adapted to attach thereto ferro-magnetic articles to be cut.

* * * * *